(12) United States Patent
Long et al.

(10) Patent No.: US 7,783,587 B1
(45) Date of Patent: *Aug. 24, 2010

(54) METHOD, SYSTEM, AND PROGRAM FOR DEFINING AND MANAGING COMPLEX CONTINGENT RULES, AND EXCEPTIONS THERETO, IN A RULE-BASED COMPUTER SYSTEM

(75) Inventors: Jeffrey G. Long, San Francisco, CA (US); Jimmy J. Jenkins, Sparks, NV (US)

(73) Assignee: Jeffrey Long, San Francisco, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 12/270,600

(22) Filed: Nov. 13, 2008

Related U.S. Application Data

(63) Continuation of application No. 11/283,110, filed on Nov. 17, 2005, now Pat. No. 7,461,042.

(51) Int. Cl.
 *G06F 17/00* (2006.01)
 *G06N 5/02* (2006.01)
(52) U.S. Cl. .......................... 706/46; 706/47
(58) Field of Classification Search .................. 706/46
 See application file for complete search history.

(56) References Cited

U.S. PATENT DOCUMENTS

| | | | |
|---|---|---|---|
| 5,463,555 A | 10/1995 | Ward et al. | |
| 5,821,937 A | 10/1998 | Tonelli et al. | |
| 5,831,610 A | 11/1998 | Tonelli et al. | |
| 5,970,437 A | 10/1999 | Gorman et al. | |
| 5,978,804 A | 11/1999 | Dietzman | |
| 6,029,169 A | 2/2000 | Jenkins | |
| 6,229,540 B1 | 5/2001 | Tonelli et al. | |
| 6,330,005 B1 | 12/2001 | Tonelli et al. | |
| 6,401,114 B1 | 6/2002 | Jenkins | |
| 6,415,275 B1 | 7/2002 | Zahn | |
| 6,445,912 B1 | 9/2002 | Cole et al. | |
| 6,678,723 B2 | 1/2004 | Jenkins | |
| 7,162,519 B2 | 1/2007 | Jenkins | |
| 7,177,855 B2 * | 2/2007 | Witkowski et al. | 707/718 |
| 7,356,558 B2 | 4/2008 | Luce et al. | |
| 7,461,042 B2 * | 12/2008 | Long et al. | 706/46 |

FOREIGN PATENT DOCUMENTS

EP 0514231 A2 11/1992

OTHER PUBLICATIONS

"A new notation for representing business and other rules", Semiotica, vol. 1334/3 (1999).

(Continued)

*Primary Examiner*—Michael Holmes
(74) *Attorney, Agent, or Firm*—Jonathan A. Small

(57) ABSTRACT

An apparatus for storage, selective inspection, and execution of complex, contingent rules, comprises a computer having one or more central processing units, a user interface, and magnetic, optical, or other media for data and program storage and retrieval. Rules are defined partly as programs and partly as data. Access procedures are provided for selecting certain appropriate rules under defined conditions. Output procedures are provided for conveying the results of the rule selections to people, to the computer executing the rules, and to other computers.

7 Claims, 5 Drawing Sheets

OTHER PUBLICATIONS

"Ultra-structure: A design theory for complex systems and processes", Comm. of the ACM, vol. 58, No. 1, p. 103 et seq. (Jan. 1995).

Naitoh et al., "A variable ordinal structure model for fuzzy reasoning and its application to decision problem of working order", Industrial Electronics, Control and Instrumentation, 1991, Proceedings, IECON '91, 1991 International Conference on Oct. 28-Nov. 1, 1991, vol. 2, pp. 1536-1543.

Paz et al., "The development of knowledge for maintenance management using simulation", Systems, Man and Cybernetics, IEEE Trans. vol. 24, Issue 4, Apr. 1994, pp. 574-593, Digital Object Identifier 10.1109/21.286379.

Frimpong et al., "Developing an effective condition based maintenance program for substation equipment", Rural Electric Power Confernece, May 4-6, 2003, pp. C6-1-C6-9.

Meijer, "From functional organizations to product-oriented organizations: a design methodology", Engieering Management, Digital Object Identifier 10.1109/EMS.2000.872530.

* cited by examiner

METHOD, SYSTEM, AND PROGRAM FOR DEFINING AND MANAGING COMPLEX CONTINGENT RULES, AND EXCEPTIONS THERETO, IN A RULE-BASED COMPUTER SYSTEM

REFERENCE TO RELATED APPLICATIONS

The present application is a continuation of copending U.S. patent application Ser. No. 11/293,110 filed Nov. 17, 2005, to which priority is claimed and which is hereby incorporated by reference. The present application also claims priority to U.S. Prov. Patent Application Ser. No. 60/629,078 filed Nov. 17, 2004, which is also incorporated herein by reference.

FIELD

The invention pertains to the general field of information science, and its subfields of expert systems (production rules) and information technology (database theory). As currently implemented, the invention pertains to computer-based systems to aid in the management and operation of any organization by use of various rules which define how the organization ought to behave in reacting to various complex stimuli such as are represented by customer orders, inventory status changes, and pricing changes.

BACKGROUND

1. The Status Quo

Software developers have been trying since the commercial electronic computer was introduced in 1951 to make computers reliably support organizations in all areas of activity, such as finance, sales, distribution, manufacturing, personnel, purchasing, etc. However, the complexity of rules within an organization, their constant changeability, and the traditional methods of encoding or representing those rules have all resulted in systems that, while partly successful, are very large, complex, expensive, and time-consuming to build, and technically difficult (sometimes impossible) to change.

Traditional software systems are built by representing the rules of the organization in software, while the facts describing the environment are normally encoded as data (e.g. the quantity on hand of a particular product).

In traditional software systems, rules are specified using three programming language constructs: (1) "If-Then-Else" constructs that tell the application what to do if certain conditions are either true or not true, (2) "Case" statements that allow more complicated choices where any number of separate conditions can be specified, and for each condition different software (and therefore different rules) can be specified to be executed, and (3) rules can be specified in a simple sequence: do A, then B, then C, without any conditions specified. Any number of such rules arranged in an ordered list is called an "application". Frequently, rules are triggered based on the user performing certain actions ("events") such as opening a form or clicking on a button.

In other cases rules are triggered based on the current state of affairs represented to the system by means of facts. Facts represent the state of entities that the rules act upon, such as customers or products. Facts are often represented using relational data structures, which require each table to have a single column constituting the unique key of each record ("primary key"), and any number of other columns as long as they are each related somehow to the primary key and do not duplicate other columns in the table. In a typical business application there can be millions of records distributed throughout thousands of separate tables. Depending on the application language and DBMS, facts can also be represented using more complex structures including objects.

2. Analysis of the Problem

We use the term "Ultra-Structure" to designate a new technology for analyzing and representing any kind of rules as data rather than as software in any software application. A full description of an earlier version of this invention was published in the January 1995 issue of the Communications of the ACM. Prior to that it was published by a withdrawn EU patent application. It has also been described conceptually in an article in Volume 133-1/3 (1999) of Semiotica. All of those documents focused on the application of Ultra-Structure theory to work management within organizations.

Much of the problem with current applications is that their designers have failed to understand that "work generation and management" is the common denominator of all organizational activities including (but not limited to) businesses, government entities, and charitable organizations, or that work generation and management can be accomplished and described solely by rules. Current applications do not define and encapsulate the rules and the rule-management process (rules about rules) underlying those various work activities such that the actual rules to be followed are defined as data that is read, executed, and managed with a relatively small and simple set of software programs, and that can be changed directly by trained rule-makers within the organization without recourse to modifying the computer program code.

Since current applications typically embody most if not all rules in the application software, and each group of applications is designed separately based on the area or sub-area of organization activity it is intended to support, current applications are extremely complex with many millions of lines of code and thousands of interlinked tables.

When one wishes to change the rules, the application software and data structures themselves must often be changed, an activity which has great risk of creating unexpected side-effects. Changes further require communicating organizational needs from a rule-maker to a computer programming expert, an activity which is fraught with the risks of misunderstandings. Adding, changing or deleting rules is thus an expensive, time consuming process which prevents organizations from changing their rules as quickly as they would like to (for example, in response to reorganizations, work process reengineering projects, changes in law, or as the result of a merger or acquisition). In some cases the changes to software and data structures take a long time to implement, or cannot be implemented at all without a rewrite of the system, so the organization must employ expensive "workarounds" to circumvent the inertia of the application that is supposed to support the organization.

Another limitation of current applications is that they deal only with "explicit" workorders such as an order from a customer to the organization to ship a product to the customer. The application's response and the organization's response to such a request are then defined by rules that are encoded either in the application's software or externally to the application via standard operating procedure manuals or in worker's minds.

Current applications generally are not designed around the fact that each explicit workorder invariably connotes a plurality of "implicit" work, i.e. actions necessary to carry out the explicit workorder, such as "perform a credit check" or "get the item from inventory". Indeed each "implicit" workorder can have its own implicit workorders, and in general any "stimulus workorder" can generate multiple "response workorders" to as many layers of depth as rule-makers wishes to define.

Current applications also generally do not recognize that much of the work of an organization consists in grouping workorders together in various ways, and linking workorders to one another, for various purposes. For example, an "order" is a collection of individual explicit requests, and an "invoice" is a collection of delivered orders. Entities such as "invoice" have their own attributes, but their primary contents are defined by the workorders they reference.

Further, whenever an explicit workorder is made for the organization to do something, the workers often need to know other things before or as they do the work that is implicit in an explicit workorder. There is a need therefore for a system wherein workers who are carrying out such work can have access to other information which they need to know in order to do the work as well and as quickly as possible (such as what and where inventory is available).

As a result, executives and end-users often feel hindered rather than supported by the computer applications they use. Applications are often viewed as impediments, and a gigantic source of inertia and inefficiency that prevents organizations from being able to quickly respond to marketplace or other demands. It is not unusual for medium and large organizations today to maintain 10-50 million lines of code, at a direct cost to them, for software alone, of 1% or more of their total revenue. This situation has been caused by an inadequate analysis of work management and a design approach that calls for defining rules almost exclusively via software.

3. Alternative Approaches

There are a large number of approaches that perform some of the desired functions for an organization, but these are different than the invention in the ways noted below.

3a. PERT/CPM Systems

Program Evaluation and Review Technique ("PERT") and Critical Path Modeling ("CPM") systems are planning tools that allow its users to sequence a series of specified tasks, estimate work times and assignments for each task, and to thereby compute various dates (e.g. projected completion date) and resource loadings. They are helpful when planning projects that involve many tasks, primarily in terms of allocating work among resources and predicting a completion date for the project if all the tasks specified occur in the order specified. The nature and sequencing of tasks is fully defined in advance and is not contingent upon the results of real work being done, i.e. PERT/CPM systems do not normally specify alternative tasks and pathways to be followed under other-than-expected actual conditions. They provide no notification to workers of what the steps are, and no decision support for the workers who are to carry out the required work steps. They are useful as planning tools but they are not work process managers.

3b. Parameterized Application Software Packages

Parameter-driven applications allow users to specify which rules, from a limited list, should be followed by the application. These options are typically encoded by parameters (data values) specified by rule-makers and loaded at startup or during runtime. Parameter-driven applications giving users more flexibility about specifying the rules to be executed. However, this approach requires application developers to imagine and implement many sets of alternative rules, thereby making the application far larger and harder to maintain over time. The rules are still in the software.

As a result, organizations using such packages frequently must either (a) change their rules to fit the options provided by the package, or (b) invest enormous time, effort and money in changing the software in the package to support the organization's existing rules.

3c. Document Control Systems

Document Control Systems provide a way to pass documents around within an organization. These are typically used along with electronic images of the documents to be worked on. The technology has very simple conditions that are used to determine work processes, so conditional paths are difficult if not impossible to define.

3d. Expert Systems

In great contrast to IT practices, the Expert Systems branch of the Artificial Intelligence ("AI") community represents most rules outside the software of a system, in an area usually called the "rulebase", and keeps data regarding facts about the outside world in a "factbase" (usually not a Database Management System, "DBMS", but rather any physical table on a disk drive). The unique characteristics of an expert system are separate memory areas for rules and facts (which are loaded at system startup), a rule-to-fact matching capability (implemented as a cycle through a set of rules), and selection and execution of one or more rules, resulting in some change to the fact memory.

Expert systems are usually architecturally composed of an expert system language interpreter (an expert system "shell"), one or more tables containing rules (the "rulebase") structured in some declarative rule language specifying and encapsulating the logic of the system, and one or more fact sources (usually from tables). The shell knows only how to read and apply the rulebase rules; all procedural knowledge is specified in the rulebase, and all state-of-the-world knowledge is specified in the factbase.

Expert system rules have a "left hand side" and "right hand side," and are called "production rules" or "productions". The left hand side of the rule is composed of fact patterns to be matched, while the right hand side is the action that the system should take against the factbase. Any number of such production rules arranged in an ordered or unordered list is called a "production rule system". Production rules may be encoded in several ways but are mostly encoded in "Object-Attribute-Value" ("OAV") data structures, where each object has x number of attributes, and each attribute may have y number of values.

Facts represent the objects of interest that the rules act upon, and are also typically represented using OAV data structures. To describe these in relational database terms, the "object" roughly corresponds to a primary key column of a table; the "attribute" maps to the name of a non-primary-key column in a table; and a "value" maps to the cell value found at the intersection of the key value on a unique row and the attribute column. Depending on the rule language, facts can also be represented using more complex structures including objects.

Expert Systems typically run in cycles, where each rule that is fired modifies the factbase content, so that the next cycle of the system may fire a different rule than the last cycle. These systems take the facts in seriatim order, and do not generalize or otherwise modify them; as a result they mimic, as they were intended to do, the human cognitive processes associated with diagnostic or exploratory activities, rather than a flexible, user-changeable way to analyze complex stimuli in parallel, after various complex classificatory transformations, to generate complex predefined responses.

The expert system shell maintains two separate memories: rules are loaded into rule memory and facts are loaded into the working memory (asserted) of the expert system shell. The expert system shell is independent from rule or fact implementation details. Typically expert system execution involves matching facts against the left hand side of rules cyclically until the system terminates. At the end of each cycle typically one matched rule is executed against its matching facts. As a result, facts are consumed and produced during each cycle. Execution continues until no more facts can be matched or until an explicit halting rule is fired. A central problem with rule based expert systems is efficiently handling the many-to-many matching problem between rules and facts.

Modern expert system shells make use of built-in optimization algorithms to reduce what would normally be an exponentially increasing execution time ((# Rules) times ((# Facts) raised to the power of (#Left-Hand Side Patterns))) to an execution time that increases linearly based on the size of the factbase. The optimization algorithm leverages the fact that most rulebases are static and that only a small percentage of facts changes during each cycle. The optimization algorithms are usually structured as networks that keep track of rule-fact matches and efficiently update the network to reflect fact consumption and production. Most modern production rule systems, and thus most modern expert systems, are designed this way.

In spite of these advances, expert systems generally start having maintenance problems before they even reach one thousand rules in the rulebase. Real-world rule-based applications will almost certainly exceed 100,000 rules, i.e. two orders or more of magnitude greater than is currently supportable.

SUMMARY

The invention constitutes a method, system and program for better representing a large number of complex and contingent rules, and exceptions to such rules, as data rather than purely as software. Among other uses, this system and program may be practically employed as a way of building enterprise management systems for organizations. Other possible uses include any descriptive or prescriptive system (model) of any complex system such as biological systems or legal systems.

The teachings of the invention are at least in part embodied in software which will sometimes hereafter be referred to as the "CoRE650" or the "system". "CoRE" is an acronym for "Competency Rule Engine (it used to stand for "Corporate Operating Rule Executor," but that phrase was too limited), and Model 650 refers to the Dewey Decimal classification number for organizations. The CoRE650 is but one embodiment of the best known mode of practicing the teachings of the invention at this time.

An objective of this invention is to enable authorized rule-makers to add to, modify, or delete an application's rules directly, without having to modify the application software. This is accomplished by encoding into data as many of the rules as possible, rather than encoding them in the application's software. These rules are "prescriptive", meaning they are actively used to manage the application's behavior, rather than being "descriptive" and merely documenting what occurs or ought to occur in a specific situation. When embodied in a system to manage work in organizations, the rules thereby shape the organization's behavior.

Another objective is to allow the expertise of the organization to be explicitly, externally and formally represented so that it can be shared, revised, and documented better than it can be if it exists only in the minds of rule-makers. This kind of knowledge includes defining an ontology specifying what distinctions exist as far as that organization is concerned, such that rules can be made to respond to these distinctions. In this regard there will be one ontology for each major category of entity in the system (e.g., agencies, locations, products and services, etc.).

Another objective of this invention is to define all approved work that any organization performs as a series of "workorders", along with the desired sequence for executing that work. Thus an invoice is considered a workorder from an organization to a customer of that organization, and a check from a customer is considered a workorder from a customer to its bank, on behalf of the organization. Some potential tasks generated by the system itself (e.g. proposed transfers or purchases) are stored in a pre-workorder state pending review and approval by an authorized user; these are not considered to be "approved work" until then.

Another objective of this invention is to permit organizations to define any logically possible manner of doing work. By encoding in the data structures the "deep structure" of all organizations, i.e. not the rules themselves but the logical form of the rules, the same (or very similar) CoRE650 software and data structures could be used by numerous organizations having very different rules. As an example, work processes can proceed seriatim or in parallel; so as long as these capabilities can be intermixed as necessary then no organization should be able to come up with another fundamental type of work sequencing. Similarly, organizations of entities can either be strictly hierarchical (each child can have only one parent) or networked (each child can have many parents). No organization should be able to come up with another fundamental type of structure as all logical possibilities are already supported.

These objectives are achieved at least in part by defining work process (i.e., procedural) rules in a series of "protocols", where a protocol is a specific set of rules triggered under a specific set of conditions. Each high-level protocol (such as "Deliver Product", "Purchase Product", or "Count Inventory") may contain many rules and sub-protocols. Each high-level protocol or sub-protocol may have many variations, depending upon the circumstances at that time and the results of the previous step (e.g. "Work Completed" or "Error Prevents Further Processing"). Work protocol rules are implemented as a collection of data records which have selection columns the contents of which define a "primary key" for the table, and which have other data columns the contents of which define "implicit" tasks that must be considered and perhaps done if the conditions in the key are met.

The objectives of the invention are also achieved at least in part by defining structural rules as a series of "attributes", where an attribute is a specific value or category that is assigned to a system entity and which may be used to trigger inspection of protocols. Each entity in the system may have many attributes associated with it; attributes are essentially references to other entities in the system.

The process of "invoking a protocol" uses the exact values of a "stimulus workorder" in conjunction with a "meta-protocol" to extract, filter and generate additional "implicit workorders", and/or to add informational attributes to existing workorders. The results produced are based upon the exact contents of the data columns in the stimulus workorder, the contents of filter data columns (If-conditions) in the protocol, what the translation columns of the meta-protocol specify, and the exact contents of the appropriate attribute structures which group entities into classes and/or specify attributes for entities.

The meta-protocol is a collection of data records that define relationship and/or attribute values that are used to form keys. These values are defined by rule-makers based upon the way management wishes the organization to respond to certain stimuli, and are used with the contents of certain data columns in the stimulus workorder to form keys by which certain records in the work protocol data are selected. The meta-protocol records also define the order in which the data records from the work protocol data structure are selected.

An important concept involved in the selection process carried out by the meta-protocol is the use of attributes that define various aspects of an entity as well as categories into which the entity has been placed. An attribute can be defined to represent anything needed to be known about an entity either by a computer or by a person (e.g., a worker in the organization). Rule-makers may define new attributes by defining them in an Attribute Types Table. Attribute Tables are data structures whose contents specify all known attributes of all known entities. They permit rule-makers to group entities such as customers or products into any number of classes, such that any entity or class can have any number of parents or children. The careful use of attributes permits rule-makers to define far fewer, and therefore far more manageable, work protocol rules because rules do not need to be defined on a case-by-case, by-entity basis but instead can be based on arbitrarily rich classes of entities (customers, products, locations, time periods). As an example if the stimulus workorder deals with product X which is classified in the product network as "Has-Product-Type Y" and if a meta-protocol record had a "Has-Product-Type" relationship code in it, the product network data structure would be accessed utilizing a key which included product X and the relationship code "Has-Product-Type". The product network might have a record that matches this key and identifies product X as being of type Y. The meta-protocol would then use type Y as part of the key subsequently formed to filter data records from the work protocol rules data structure.

A similar process of specifying attributes (rather than relationships) can be used to contingently filter work protocol records. Collections of attributes are defined in a plurality of attribute tables. The careful use of attributes permits rule-makers to define far fewer, and therefore far more manageable, work protocol rules to be defined on a case-by-case, by-entity basis but instead can be based on arbitrarily rich attributes.

With the exception of free-form text columns and columns storing date-time or numerical values, all attribute values refer to values defined in existential tables. To give more flexibility to rule-makers, the invention allows for the specification of sources other than the normal clusters in the Meta-Protocol table. For example, a rule can be established for COD customers, and the determination of whether a particular customer falls under that rule might be made based on the customer's status as of order entry time, rather than their current status. By indicating to the system the cluster to be checked for this value, the Meta-Protocol Table allows users to define whether to use current or historical credit status. In the current implementation, any value in the Meta-Protocol Table is considered to be a relationship code and is resolved via the associated network. Rules that require the use of a workorder as a source (since the workorder takes a snapshot of certain customer attributes as of order entry time) are indicated by an asterisk and the specification of the appropriate attribute type to be used in searching the workorder attributes table.

This filtering/selection/extraction process using the meta-protocol and the networks can result in either (a) an un-sequenced collection of implicit workorders, or (b) a set of attributes and values that are to be attached to one or more workorders, or (c) both. The actions taken are defined by the selected work protocol records whose keys matched the keys assembled by the meta-protocol with the aid of the various network data structures and the contents of the data columns of the stimulus workorder.

Any work attribute values extracted during this process of "invoking a protocol" are used to update workorders of any type (grouping, explicit, or implicit) within the order currently being processed. The sequencing of selections based on the meta-protocol records is important because once an attribute has a value (e.g., sales tax rate is set to 0.06), any subsequent protocol rules that specify a different value are ignored. Since meta-protocol rules are sequenced from most specific to most general, this ensures that "exceptions" to rules supersede any general rules. This avoids the need for a step under the older Ultra-Structure design of screening for duplicates in a process called "collision detection".

When a number of explicit workorders are placed at one time, they are usually grouped into a single unit called an "order", which is represented as a new and separate "grouping workorder" whose purpose is to add structure to the collection of workorders in the system.

The invention defines a plurality of different types of "work queues" to which work may be assigned. The work queues in the current preferred embodiment support the warehouse receiving, warehouse picking, order entry, billing, cash application, cycle counting, shipping, and purchasing functions of an organization such as a wholesale distribution company. The teachings of the invention are of course applicable to any type of organization, and to any type of work process of any organization.

Another objective of the invention is to provide its users with decision-support, which means that activities and decisions they must make for their particular job function are facilitated by the information that can be calculated and/or displayed by the system. The decision support objective is achieved through the use of "decision panel" forms for each work queue type, and buttons or other controls defined for each type of decision panel. Each control, when invoked, allows the user access to additional information needed to perform the work defined by implicit workorders listed on that user's work queue.

BRIEF DESCRIPTION OF THE DRAWINGS

The invention is described in detail with references to the following figures.

DESCRIPTION

Figure 1:
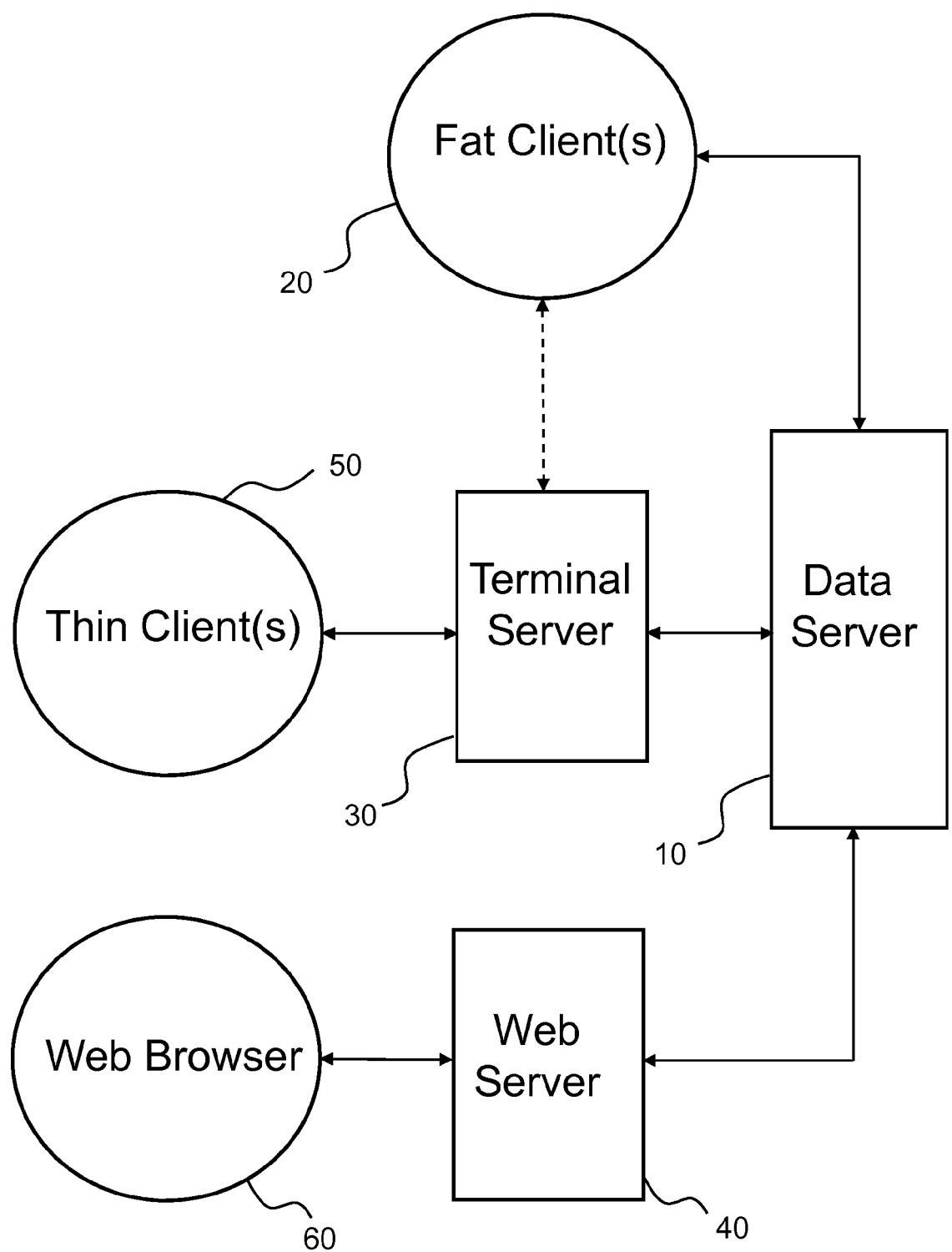
FIG. 1 is a schematic diagram of the current computing environment in which the teachings of the invention are practiced.

The teachings of the invention are built around certain key concepts, described below.

1. Competency Rules

The term "competency rules" includes any rules about an organization's structure or processes, including (but not limited to) standard operating procedures, pricing rules, work processes, exceptions to rules, and its organizational structure. Competency rules include non-procedural rules specifying (for example) relationships and attributes (e.g., whether a customer has a COD or an Open Account credit status; who is the salesman assigned to a certain customer; how products are categorized). Competency rules include assertions that something exists ("existential rules", such as the assertion that customer #3535 exists, or that product ABC exists). Thus non-procedural rules include many details that are normally considered to be mere facts rather than rules. Competency rules stand in contrast with "logical rules" that specify rules of Aristotelian, propositional, predicate, or some other form of logic, which are independent of the competency rules pertaining to any given organization. Logical rules as used herein also define the sequence in which the application should look at various tables, and other "meta-procedural" rules that are not specific to any given organization.

2. Workorders

Workorders are collections of data records stored in the Work Cluster that authorize, assign, and track the completion of work within an organization. There are three types of workorder: "explicit" workorders initiate a new set of tasks, and may be generated only by authorized requesters; "implicit" workorders define work that is implicit within an explicit workorder; and "grouping" workorders group together a set of explicit workorders. Since explicit workorders can trigger implicit workorders, and implicit workorders can trigger further implicit workorders, it is useful sometimes to refer to the triggering workorders as "stimulus workorders".

3. Work Protocols

Work protocols define all the implicit work that may be triggered by a stimulus workorder. There are three kinds of response to a stimulus workorder: (a) no response (i.e., a terminal node has been reached); (b) generation of an implicit workorder; or (c) generation of an attribute type and value that may be attached to an existing workorder. Work protocol rules are intended to enable an organization to define all critical success factors necessary for all parties to a transaction to be represented and to have a satisfactorily completed (business) transaction.

4. Work Queues

Work queues are assign-to agencies whereby work is done; they can be people, departments, other companies or institutions, computers, or other machinery that is not considered to be primarily a computer. These can be internal facilities (such as employees or factory machines) or external facilities (such as outside vendors or government agencies). Each type of work queue has its own user interface; for example there is one interface for order entry, another for delivery confirmations, and another for purchasing. Many but not all of these interfaces are embodied as "decision panels" on a Work Queue Management Form.

5. Decision Support

Decision support has to do with not only telling someone at a work queue what the work is that they should do, but also providing support for the completion of the work. This involves provision of specialized information that can be invoked by controls on a form. When these controls are used from a work queue panel, the system provides access for the user to other data stored on the system that the user needs to know to accomplish the work ordered by the implicit workorders. The goal is to assist users to improve the quality as well as the quantity of work they complete by having the system (a) provide additional information for human decision-making, and/or (b) apply rules that enable the system to propose what work should be done. An example of providing additional information is to show the history of purchase costs for a part when a human decision-maker is deciding whether to give a customer a lower price than normal for that part. An example of applying rules is to propose what products should be transferred between specific warehouses, and displaying these proposals so that a warehouse manager can review and approve, change, or deny them.

6. Clusters

A set of tables that work closely together and refer to one another is called a "cluster". In a typical implementation of the CoRE650 there will be several clusters such as (but not limited to) the Agency Cluster, Location Cluster, and Product or Service Cluster.

Each cluster has an Existential Table that declares what entities of that cluster type in fact exist. Thus the fact that customer 1234 exists will be stated by means of a record in the Agency Existential Table.

Each cluster has an Attribute Table that defines the attributes of each entity by reference to its own or other clusters. For example, a customer will be associated with a ship-to location (e.g., a street address) via the Agency Attribute Table, which will have a record specifying the Agency ID (i.e. customer ID), attribute type (i.e. ship-to location), and a location (e.g. street address) which must have been pre-defined in the Location Cluster as a valid (existing) location. Attribute clusters also define relations among entities of the same type (i.e. in the same cluster) so as to define the categories into which a given entity falls.

Each cluster may have other specialized tables associated with it, such as a Chronology Table, a Logic Table, or a Network Table.

DETAILED DESCRIPTION

In its current implementation for managing work within and among organizations, the teachings of the invention are embodied in approximately 400,000 lines of C# code (including comments and blank lines); 500 stored procedures, and 50 tables, which are collectively called the "Competency Rule Engine Model 650" ("CoRE650" or "the system"). These programs can run on any computer that runs the Microsoft ".NET"® environment and the Microsoft SQL-Server® database system. The teachings of the invention may be embodied in many different computer languages and running in many different operating system environments on many different computer platforms.

Referring to FIG. 1, there is shown a diagram of a typical computing environment in which the teachings of the invention are employed. While multiple computers are shown, the application may run on one computer if desired; and it can be run on any sufficiently capable type of computer from mobile telephone to personal computer to minicomputer, mainframe, or supercomputer. Typically, each computer has an input device such as a keyboard, an output device such as a display, data storage, random access memory, one or more central processing units, and a printer, none of which are shown in FIG. 1. If more than one computer is used, the computers may be linked by local-area networks, wide-area networks, radio, or other medium of sufficient transmission bandwidth. In some embodiments, the teachings of the invention may be utilized on a single personal computer with no network and no separate work queues.

The operations of the computers {10, 20, 30, 40} are controlled by a set of programs some of which embody the teachings of the invention and some of which are for other purposes such as operating system programs to manage the resources of the machine, database management programs to manage data access, etc. In the data server computer {10} of FIG. 1, the teachings of the invention are partially embodied in and carried out by a set of "back-end" programs including a plurality of stored procedures, database functions, and logical views, which are designed to be executed by a particular database management system. In the fat client and terminal server computers {20, 30} of FIG. 1, the teachings of the invention are partially embodied in and carried out by a set of "GUI front-end" and "middle-tier" programs, a plurality of software objects which are designed to be executed by a particular programming environment such as Microsoft's ".NET"® environment. In the web server computer {40} of FIG. 1, the teachings of the invention are partially embodied in and carried out by a set of "Web front-end" programs, a plurality of internet access software objects which are designed to be executed by a particular programming environment such as Microsoft's "Web Services" environment. The hardware and operating system, as well as other required support software not included in the teachings of the invention, can be any of the various commercially available systems, although the invention would need to be modified (ported) to each different environment.

In a typical application in an organization having more than a handful of employees, the preferred environment is a network where the data server computer {10} has high-speed links to the terminal server computer {30}, which in turn is linked to a multitude of thin client terminals {50} and/or fat clients {20} by a local-area or a wide-area network. The data server computer {10} also has high-speed links to the web server computer {40}, which in turn is linked to a multitude of web browser terminals {60} by the Internet.

Typically, the data and database management system needed to implement the teachings of the invention are stored on magnetic media in the data server {10}. For fat clients (e.g., standard personal computers), copies of the programs comprising the system are installed on the fat client computer {20} prior to processing. For thin clients {50}(i.e., without local data storage or significant independent processing capabilities), copies of the programs comprising the system are stored in a terminal server {30}. However accessed, whenever data is revised, the updated data is then written to the database system and data tables in the data server {10}.

Figure 3:
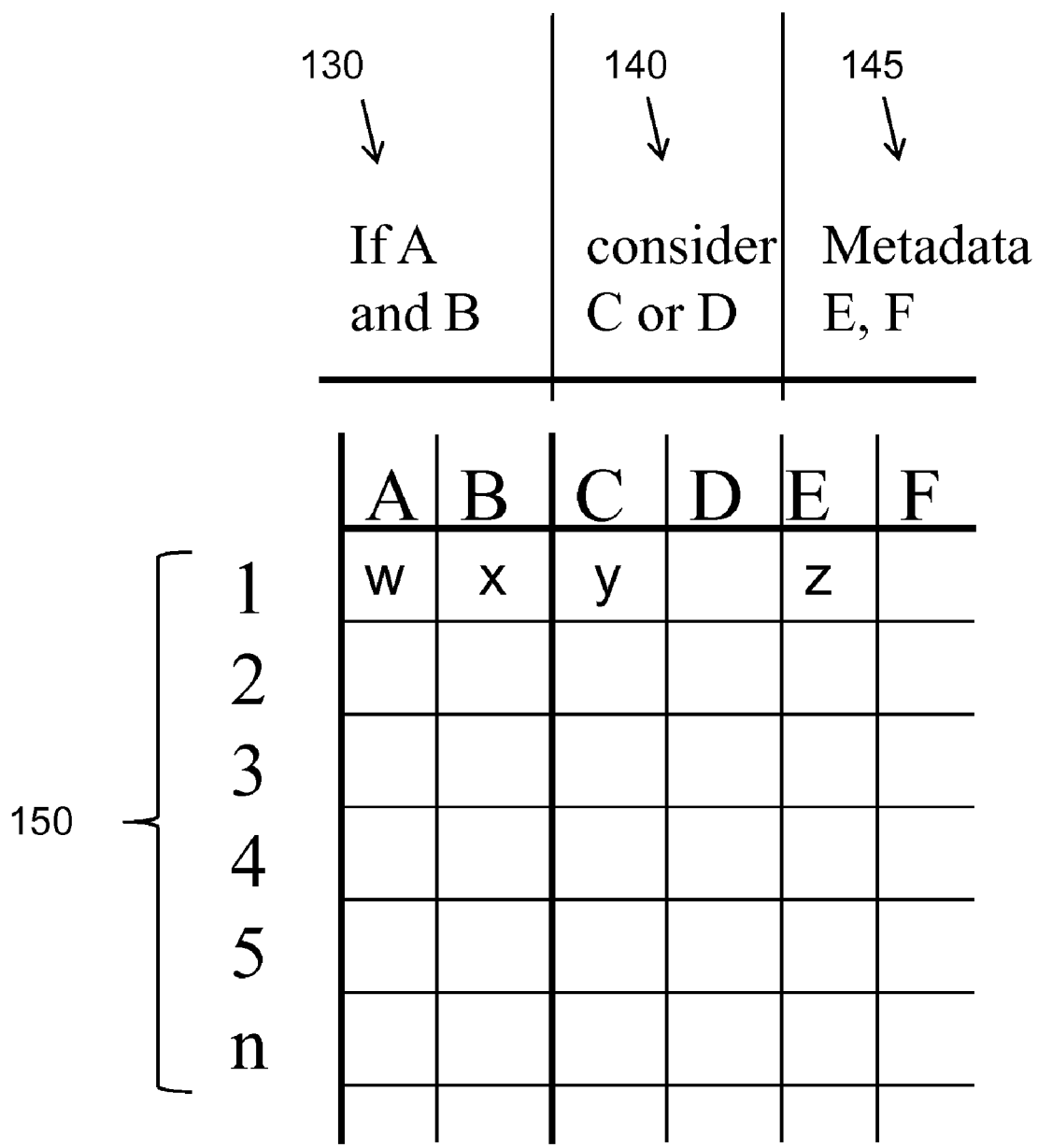
FIG. 3 is a schematic diagram of the type of data structure used to encode a typical rule.

Rules are defined by the users when they set up the system or at a later time, and are used to control the nature and flow of events that occur in the CoRE650. Referring to FIG. 3, a rule is defined as a row of data {150} in a table. The primary key(s) of the table {130} (columns A and B in FIG. 3) serve to define conditions under which a particular rule should be inspected. The non-primary-key columns of the table {140} (columns C and D in FIG. 3) constitute the action portions of each rule, or metadata {145} (columns E and F in FIG. 3). Selecting a rule for inspection is not the same as firing it, since there may be other rules that take precedence and these rules for selecting rules to fire are defined in other tables or in the software.

The CoRE650 stores all information about workorders in the Work Cluster, consisting of the Work Table, Work Attributes Table, Work Network Table, Work Chronology Table, and the Work Logic Table.

Figure 4:
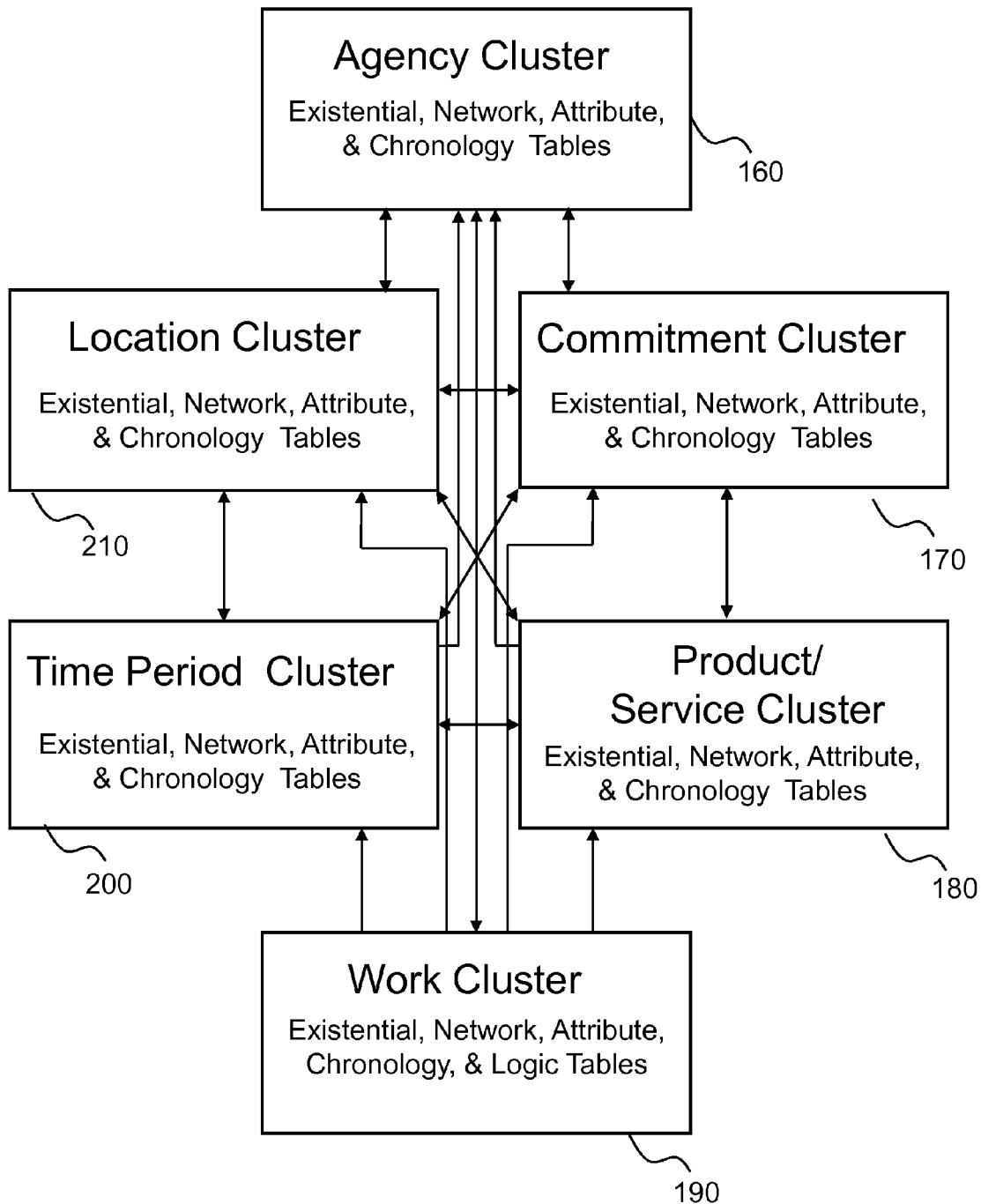
FIG. 4 is a diagram of the way various clusters of rules relate to each other so as to ensure referential integrity in the system.

The CoRE650 stores all other rules in sets of tables called "clusters" which reference one another as illustrated in FIG. 4. Each cluster contains one Existential Table, one Attribute Table, and possibly other tables as needed.

Figure 5:
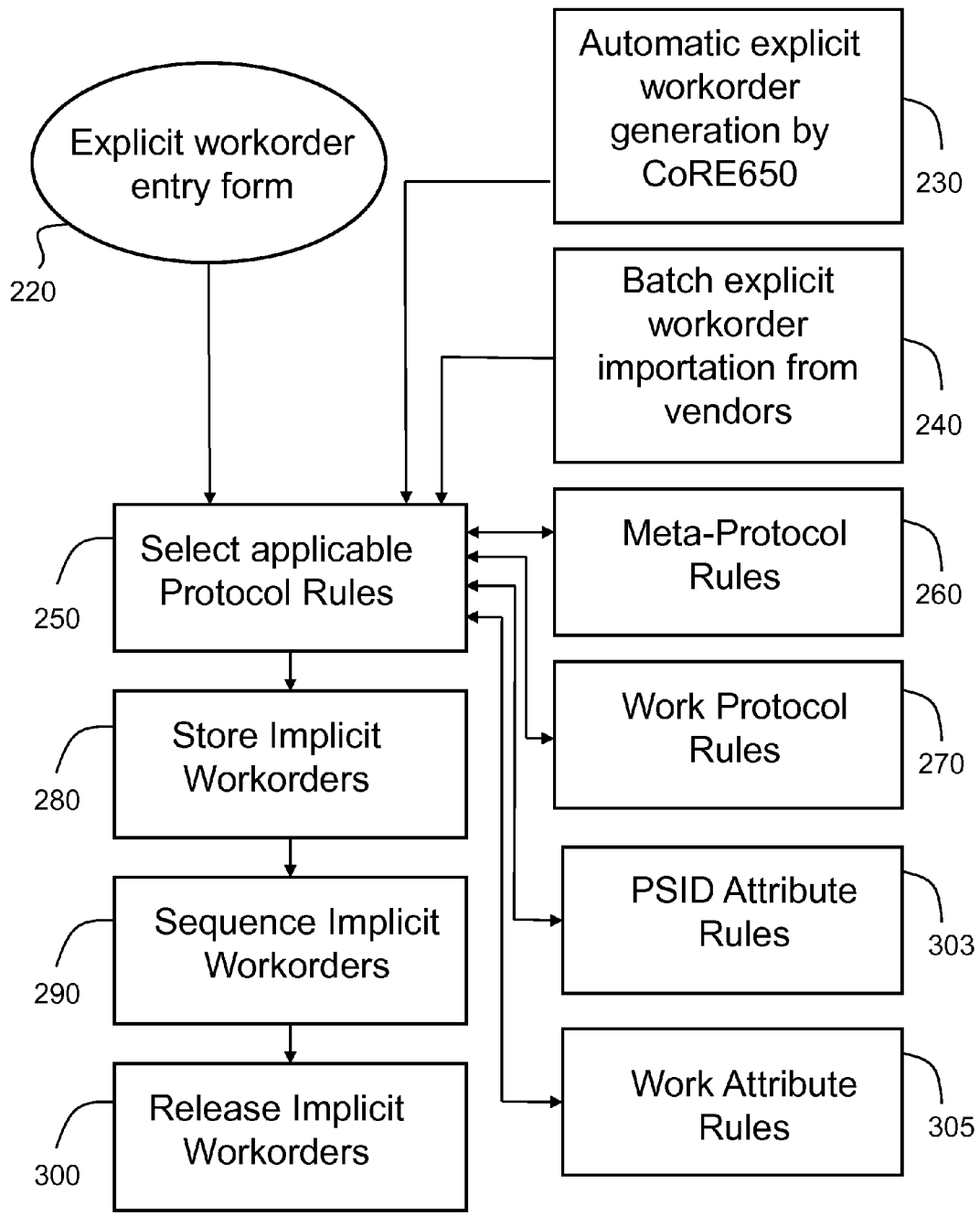
FIG. 5 is a simplified flowchart of the process of generating implicit work orders from explicit workorders.

Referring to FIG. 5, when a new explicit workorder is entered {220, 230, 240}, the application invokes the high-level protocol {250} associated with the type of order that was entered. The system checks the Master Protocol Table {270} and Meta-Protocol Table {260} based on the high-level protocol and the specific values of the explicit workorder (e.g. product ordered, customer ID); it uses these to navigate the appropriate attribute tables; it determines the appropriate work; it checks a "Zoo Table" (not shown) for the next available workorder number based on the type of order that was entered; and it writes these generated attributes and implicit workorders to the Workorder Cluster {280} for subsequent completion by their assignees. Thereafter the work will be sequenced and made available to the assignees according to work sequencing instructions {290}, and will be displayed in the Work Queue of each assignee {300}.

1. The Rule Definition Process

Figure 2:
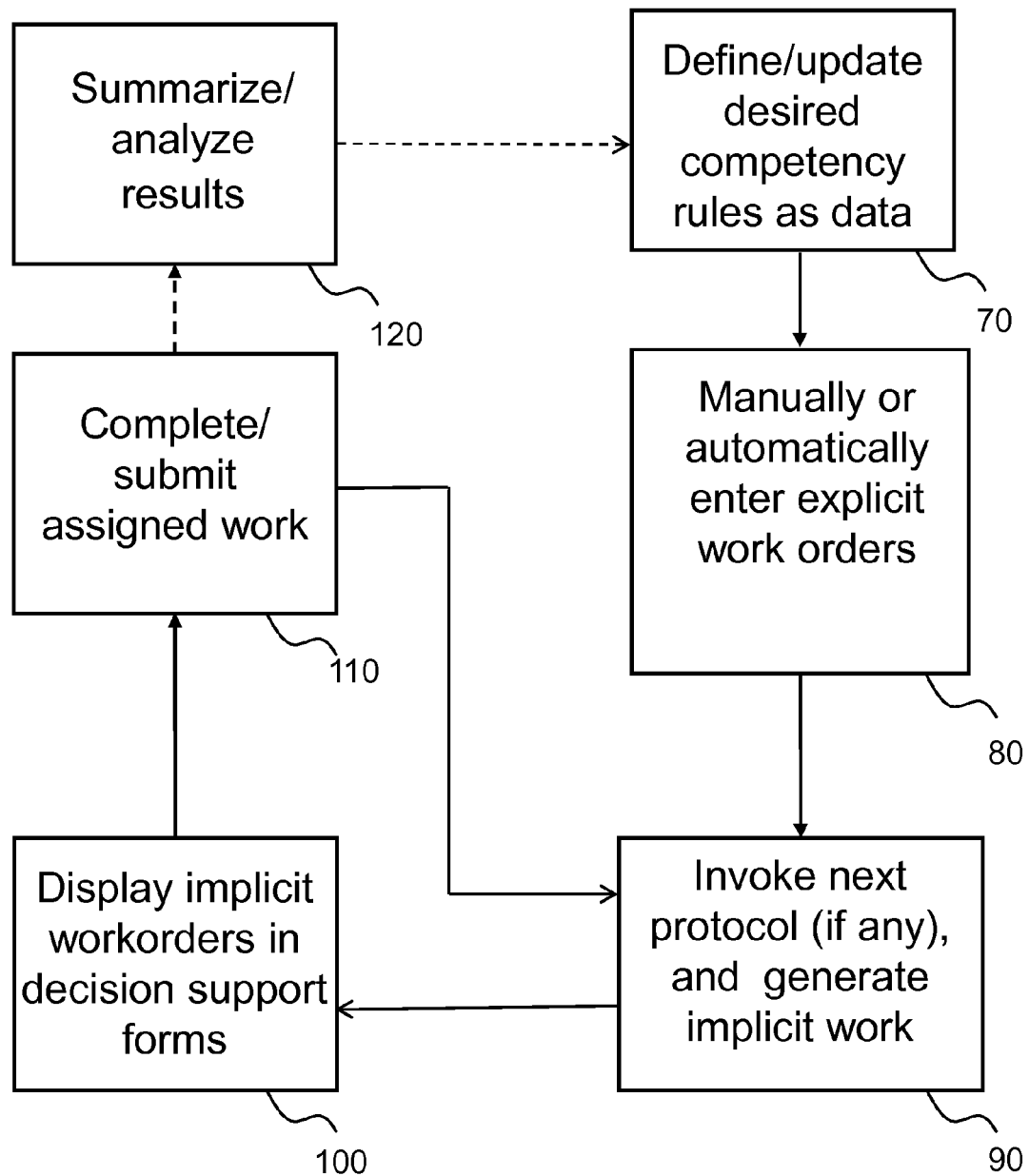
FIG. 2 is a simplified flowchart showing the rule development, application, and analysis cycle.

Referring to FIG. 2, there is shown a flow diagram demonstrating the process of using the teachings of the invention. Step {70} in FIG. 2 represents the process of defining the desired behavior of the organization in the form of work protocol rules, attribute rules, and other rules stored as data in tables. The details regarding the types of data stored and the types of tables in which the data is stored for the preferred embodiment are given below.

Rule-makers define the competency rules that they wish their organization to follow in conducting its affairs and in responding to internal or external stimuli. The types of tables that define rules are listed below. The contents of each of these tables (i.e. the rules) define, guide and constrain the structure and behavior of the organization using the CoRE650. For example, a Product or Service Sourcing Table from the Product or Service Cluster defines the bins in which various products are or may be stored etc., and a Location Network Table from the Location Cluster defines how those bins are linked to various warehouses.

A data structure according to the teachings of the invention includes one or more data tables comprised of one or more data records encoding appropriate responses to various stimuli stored in one or more locations in one or more machine readable memory media coupled to one or more computers.

In creating such a rule-based system it is critical to the future manageability of the rulebase to minimize the number and type of rules defined by the system. Accomplishing this requires the ability to read, write, think about, and store rules at the level of classes or categories of phenomena, rather than having each rule apply to only very specific instances. By encoding rules into different ruleforms, even when the ruleforms have similar structure but different semantics (e.g. agency ruleform versus location ruleform), the invention makes it possible to conceptually comprehend and manage a dozen or so classes of entity rather than dealing with the hundreds or thousands of particular entities that actually exist.

Referring to FIG. 3, there is shown a diagram of a table having a few rows {150} where each row defines a rule or part of a rule. The table has one or more primary key columns ("If" or "condition" statements) {130}, and one or more non-primary-key columns ("Then" or "action" statements) {140, 145} which define all or part of the action to be considered (not necessarily taken) if the If-condition is satisfied. For example, Rule 1 in FIG. 3 might be interpreted as follows: If we have customer W who orders product X, then warehouse Y needs to consider providing service Z. Whether warehouse Y actually provides service Z may depend upon other rules that are applicable to the situation. All rules encoded in the CoRE650 data have a structure similar to that shown in FIG. 3.

The columns forming the primary key {130} are always implicitly considered to be related by a logical AND function; logical OR operations are defined by creation of new and separate rule(s). Wild card column entries in the If-condition section {130} are usually represented as "(Any)", and signify that any situation will satisfy the If-condition.

The structure of rules in the Work Protocol Table is similar, but involves about 15 If-columns {130} and about 10 Then-columns {140, 145}. In alternative embodiments, other numbers of If-columns and Then-columns may be utilized as necessary, depending on the complexity of rules to be thereby represented.

Existential tables have only one column constituting the primary key, and are used to define all entities known to the system. Existential tables all have the same form but are separated by broad semantic categories, e.g. agencies are defined in an Agency Table and Locations are defined in a Locations Table. The two tables (and indeed all existential tables) could be combined into one gigantic entities table, but this would defeat the goal and intention of making rules more manageable by separating them according to their semantics.

In any case where a table has more than one column constituting its primary key, the primary key columns have referential integrity edits against existential tables which define and limit the data values which may be entered into each column. Non-primary-key columns {140} also typically are foreign keys to existential tables. This is notably the case with Attribute Tables, where for each attribute value (with the exception of free-form text, numbers as quantities, or a date-time stamp) there is not just any value but a value limited by the requirement that the value be pre-defined in an existential table.

The data structures according to the teachings of the invention are critical in at least the following respects. It is believed to be new to use a computer to define attributes of an entity while maintaining strict control over the possible values of those attributes by means of foreign key relationships. By permitting and requiring referential integrity, this "extended OAV" construct gives its users the ability to perform cascading updates and deletions, and thereby better manage the maintenance of large numbers of rules in the system. It is also believed to be new to combine the use of data structures encoding rules of appropriate response with other data structures encoding not just networking information (which gives current status information and was present in the prior art) but also attribute information (which, when applied to the Work Attributes Table, specifies information that is not necessarily current but instead was true as of the time the order was entered or modified) which serves to classify stimuli into classes or categories which can be treated in similar fashion, thereby reducing the number of rules that need to be encoded into the data structure. This substantially reduces the amount of data needed to encode all the rules for response.

The basic kinds of data structures in the current embodiment of the invention, wherein competency rules are defined, are as follows:

1a. Existential Tables

This class of tables collectively declare the existence of every entity known to the system. An entity may be a physical entity such as a person, a legal entity such as a corporation, or a category of entity such as "employees". In the current embodiment of the invention there are existential tables to declare agencies, where agencies can be internal customers (departments or other branches), external customers (other companies), potential customers (prospects), internal suppliers (individual employees, internal task forces or work groups), or external suppliers (other vendors). The common characteristic of an agency is that it may order that an organization do work of some kind; it therefore also includes any entities that may actually do work for the organization. Other existential tables are defined in the current embodiment for locations, products or services, time periods, workorders, attribute types, units of measure, (inventory) quantity types, etc.

In the prior art, this table included columns for describing various attributes of each entity, such as its name. A typical existential table according to the prior art might look as follows:

TABLE 1

| Entity ID | Name | Updated By |
| --- | --- | --- |
| Customer 12 | Ace Building Supply | JKL |
| Employee 25 | John Jones | ASD |
| Vendor 16 | Nissan Motors | JKL |
| COD Customers | Any COD customers | RET |

In the current teachings of the invention, most attributes are moved to an attribute table (e.g., the Agency Attribute Table); the only information remaining in the existential table is the primary key column (e.g. declaring each agency or agency category) plus other non-primary-key columns defining meta-data about the rule (e.g. a Pin Flag, indicating whether the rule can safely be changed; a Research Flag, usually 0, indicating whether a particular rule needs further investigation and why; internal notes for the knowledge engineer; an UpdatedBy column showing who last updated the rule; and other meta-data information). A typical existential table now looks similar to the following:

TABLE 2

| Entity ID | Pin Flag | Research Flag | Notes | Updated By |
| --- | --- | --- | --- | --- |
| Customer 12 | 0 | 0 | | JKL |
| Employee 25 | 0 | 1 | | ASD |
| Vendor 16 | 0 | 0 | | JKL |
| COD Customers | 1 | 0 | | RET |

1b. Attribute Tables

This class of tables collectively declares all known attributes of every entity known to the system. In the prior art, this table would be used primarily to specify relationships among entities of the same kind, e.g. that "COD Customers" included "Customer 12". It is now used to additionally define other aspects of each entity (e.g., ship-to address), usually in terms of other entities known to the system (e.g. a pre-defined street address). A typical attribute table in the prior art looks similar to the following:

TABLE 3

| Entity 1 | Attribute Type | Entity 2 | Notes | Updated By |
|---|---|---|---|---|
| COD Customers | Includes | Customer 12 | | JKL |
| Full-Time Employees | Includes | Employee 25 | | ASD |
| Full-Time Employees | Includes | Employee 32 | | JKL |
| COD Customers | Includes | Customer 115 | | RET |

In the current embodiment, the primary key columns define specific entities and attribute types. The non-primary-key columns in the table each define a different type of entity that can serve as an entity attribute. With the exception of free-form text columns and columns storing date-time or numerical values, each attribute value column (e.g. a Locations column) is a foreign key to a different existential table in the system (e.g. to the Locations existential table). A typical attribute table in the current invention looks similar to the following:

TABLE 4

| Entity | Attribute Type | Entities | Locations | Commitments | Updated By |
|---|---|---|---|---|---|
| Customer 12 | HasBillingType | COD Customers | | | JKL |
| Customer 12 | HasWorkPhone | | 415-234-5678 | | ASD |
| Customer 12 | HasEmailAddress | | john@ace.com | | JKL |
| Employee 25 | HasPayrollStatus | Full-Time Employees | | | RET |

Attribute tables can still define how entities are related to one another. Each entity can be related to multiple parent entities and multiple child entities. Taken together these linkages form a hierarchical network of relationships of arbitrary width and depth.

"Attribute ruleforms" specify attributes pertaining to an entity. The most common form of these have primary keys consisting of two columns, where each column is also a foreign key to a different existential ruleform. A typical example of this would be a table where column one is part of the primary key for this ruleform and is also a foreign key to a "Products" existential ruleform, and column two is part of the primary key for this ruleform and is also a foreign key to the "Attribute Type" existential ruleform.

Each Attribute ruleform will have a set of additional columns that are foreign keys to most if not all other existential ruleforms, but these will not be part of the primary key for this ruleform. It thus will have a primary key column as a foreign key to an existential ruleform defining possible entities; another primary key column which specifies an attribute type as a foreign key to an existential ruleform defining possible attributes of each entity or entity type; and a set of columns that are foreign keys to most if not all other existential ruleforms. Because of this structure, secondary indexes can be set up to quickly access rules using columns that are not part of the primary key of the Attribute ruleform. In prior implementations, it was required that most if not all factors in a rule also constituted the primary key of a ruleform. By using secondary indexes instead, fewer ruleforms are necessary.

Attribute ruleforms are quite different from the Object-Attribute-Value ("OAV") tables that are widely used by expert systems. First, OAV tables cannot ensure that items defined as objects, attributes or values are "legal"; Attribute ruleforms, in contrast, have multiple columns, each a foreign key to a different existential ruleform, such that all entered values are checked for validity in a particular existential ruleform. Second, because of this "referential integrity", cascade updates and deletes can be specified so that rule maintenance is easier than is possible in an OAV structure.

One benefit of this is that each class of entity (say, agencies) may have major subclasses (such as "customers," "vendors," and "employees") that normally have different sets of attributes. In a typical relational table design, these would be implemented as three different tables having different attributes. Now, via an Agency Attribute ruleform, each class of entity can have all and only the attributes needed by that class of entity.

Another benefit is that metadata regarding each attribute can easily be kept, since each record only has one attribute. Who last changed an attribute, and when, can easily be tracked, along with other such metadata as may be useful.

1c. Protocol Tables

This class of table defines all the implicit work that must be performed by all parties involved in a transaction. For each "explicit" workorder which must be performed (either for an internal or external customer), there may be one or more "implicit" workorders which also must be generated. It plays a pivotal role in the generation of implicit workorders automatically from explicit workorders entered by authorized agencies. Parties to a transaction can be a vendor, a customer, or some third party. For example, an explicit workorder to deliver a product to a customer will require that a host of other actions be performed, such as credit checking, picking, shipping, payment of the shipper, return of pallets by the customer, payment by the customer within a certain time period, tax collection and payment, payment of sales commissions, special stenciling or messaging requirements, or any of many other actions which are herein referred to as "implicit" requirements of the transaction. The totality of these implicit steps is referred to as a "work protocol", and is embodied in the user-defined data stored in this table. A typical protocol table in the prior art looks similar to the following:

TABLE 5

| Agency ID | Location ID1 | Location ID2 | Service ID1 | Service ID2 | Assign-To Agency | Assign-To Task | Updated By | Update Date | (etc.) |
|---|---|---|---|---|---|---|---|---|---|
| External Customers | New Jersey | (N/A) | Regular Order | (N/A) | Warehouse 6 | Call to verify order | ASD | Dec. 15, 2004 | |
| External Customers | (N/A) | 650 Area Code | Request for Assistance | (N/A) | Customer Services Supervisor | Explain power failure | ASD | Sep. 25, 2005 | |
| External Customers | Florida | | Taxable Product | | Billing Computer | Calculate Florida Sales Tax | PIJ | Jun. 22, 2003 | |
| (etc.) | | | | | | | | | |

In the current embodiment, the primary key columns define specific entities and entity attributes or categories. The non-primary-key columns in the table each define a different type of entity that can serve as an entity attribute. Each such attribute value column (e.g. Assign-To Agency) is a foreign key to a different existential table in the system (e.g. to the Agencies existential table). A typical protocol table in the current invention looks similar to the following:

TABLE 6

| Agency ID | Location ID1 | Location ID2 | Service ID1 | Attribute | Assign-To Agency | Assign-To Task | Updated By | Update Date | (etc.) |
|---|---|---|---|---|---|---|---|---|---|
| External Customers | New Jersey | (N/A) | Regular Order | Assign To | Warehouse 6 | | ASD | Dec. 15, 2004 | |
| External Customers | New Jersey | (N/A) | Regular Order | Task | | Call to verify order | ASD | Dec. 15, 2004 | |
| External Customers | (N/A) | 650 Area Code | Request for Assistance | Assign To | Customer Services Supervisor | | ASD | Sep. 25, 2005 | |
| External Customers | (N/A) | 650 Area Code | Request for Assistance | Task | | Explain power failure | ASD | Sep. 25, 2005 | |
| External Customers | Florida | | Taxable Product | Assign To | Billing Computer | | PIJ | Jun. 22, 2003 | |
| External Customers | Florida | | Taxable Product | Task | | Calculate Florida Sales Tax | PIJ | Jun. 22, 2003 | |
| (etc.) | | | | | | | | | |

In earlier uses of protocol tables for business, the Work Protocol Table was used as a centralized place for generating work records in a Work table. Indeed, contingently generating work records was the only thing it did. Now there is a new ability, which is to generate or update attributes in a Work Attributes ruleform and to set their initial values. Thus the fact that a particular item of work is to be paid for within X days can be contingently added to the Work Attribute table by the Master Protocol. This new capability is in addition to its older task of generating new work in the Work table. The table can also, in theory, be used to specify deletions to the Work table, or additions, changes and/or deletions to any other table (ruleform) in the system.

1d. Meta-Protocol Tables

Meta-Protocol tables specify the order in which attempts to find protocol rules should occur. They also define the masks that should be generated in each step while looking for a protocol rule. The specified search sequence usually goes from more particular to more general; an exception to a rule, for example, is always more particular or specific than the general rules that apply to any given situation. Occasionally it is useful to stop searching for rules once such an exception or more-specific rule has been found. This is now indicated in the Meta-Protocol table by a Stop Flag. A "true" value means that if the specified mask retrieves a rule, then the search for further rules should stop.

2. The Work Initiation Process

Returning to the consideration of FIG. 2, after defining the desired competency rules {70}, the next step {80} is to enter or otherwise generate or accept explicit work requests in the form of workorders or other proposed actions. These are used to generate implicit work.

Orders from external customers of the organization (e.g. to deliver or return a product), are treated as explicit orders and are initiated by entering the customer requests by means of a form such as a Customer Order Entry form or web page.

Internally-initiated work orders such as inventory cycle count results are treated as explicit orders and may be entered by means of forms such as an Inventory Adjustments entry form.

Internally-initiated periodic work orders such as preventative maintenance work are treated as explicit orders and may be entered directly by the CoRe650 itself based on a schedule (itself rules) defined by rule-makers.

Work processes that are initiated by vendors (e.g., a list of checks received by a bank) are treated as explicit orders and are entered by loading files from said external sources.

Work outgoing to vendors (e.g. to purchase a product) is entered by forms such as a Purchase Order entry form.

Orders from any source can always be entered either by means of manual entry to a form designed for that purpose (whether a GUI form or a Web form), and/or they can be entered automatically by the system upon reading an appropriately configured data file.

Potential work involving future choices (e.g. the running of a program or programs for recommending transfers among warehouses, or proposing purchases of goods from various vendors) does not directly generate workorders; instead, it writes proposal records into a table. After review and upon approval, these records become explicit workorders such as a transfer workorder or a purchase workorder. Proposed work that is declined is simply deleted from the table of proposed actions.

Groups of explicit orders entered at the same time are assigned one grouping number (the "Order Number", e.g. S00000123). Each explicit workorder within that group uses the order number with a "-n" concatenated to it (e.g. S00000123-1); and each implicit workorder generated by that is assigned a third number (another "-n", e.g. S00000123-1-1) concatenated to the number of the workorder that served as the stimulus workorder. Further levels of implicit workorders are numbered in the same way, such that there might be a workorder number (e.g.) S00000123-1-3-2-1-5. These workorder numbers uniquely identify any work that is to be managed by the system.

3. The Implicit Work Generation Process

Returning to the consideration of FIG. 2, the next step in the process of using the teachings of the invention is for the computer to generate implicit work from the explicit workorders entered in step 80. This process of automatic generation of the implicit workorders is symbolized by step 90 in FIG. 2. After implicit workorders are generated, tasks assigned to people are sent to the work queues as symbolized by step 100. Tasks assigned to computers are assigned to internal work queues and are processed as they become available in accordance with the sequencing rules. The process symbolized by step 100 represents a process of selective transmission of certain types of workorders only to work queues used by the agencies that have been assigned to do that type of work. Thus, for example, an implicit workorder to pick inventory from an inventory bin will only be sent to the appropriate warehouse picking work queues, and a workorder for a credit check will only be sent to a credit checking work queue.

Referring to FIG. 5, there is shown a flow chart of the processing carried out according to the teachings of the invention in entering explicit workorders and processing them. There are a number of different steps needed to generate work correctly. These are described below and are shown in the workflow diagram in FIG. 5.

Once an order is entered and stored, the process to expand the entire order begins to generate the implicit workorders mapped to the explicit workorder. The first step in satisfying an order is to find out what needs to be done. The explicit order, in itself, does not contain any specific work or activity that can be completed. Using the rules defined by the user and stored in the tables described above, in conjunction with an explicit order, the system assembles a group of implicit workorders that, when completed, will satisfy the explicit workorder.

The CoRE650 takes each explicit workorder and, using the meta-protocol records, retrieves all applicable Work Protocol records from the Work Protocol Table. A meta-protocol defines an ordered sequence of filters used to retrieve protocol records. In other words, the meta-protocol is a series of instructions on how to form filters with which to select Work Protocol rules out of the Work Protocol Table, each said filter containing a combination of one or more primary key column contents that must be satisfied before a Work Protocol Rule is selected from which to generate implicit work. For example, the meta-protocol may specify that for the first filtering step, only Work Protocol rules are to be selected where the customer's vertical market code is found in the first column of the key and all other columns of the key are irrelevant. This would select some number of Work Protocol rules which could be any number including zero up to the total number of rules in existence. Next, the meta-protocol would specify for the next filter step some new condition or conditions such as select all Work Protocol rules where the product's hazardous material code is found in the second column of the key and the customer's state is found in the fourth column of the key. This filter criteria would then be applied against the entire set of Work Protocol rules, and not just the rules selected in the first filtering step. This process would be continued until all lines of the meta-protocol were carried out.

In the current preferred embodiment, there is only one meta-protocol table. It is a generic "recipe" for filtering out context-appropriate Work Protocol rules from the universe of available Work Protocol rules. The specifics of the filter conditions used in the meta-protocol filtering steps are used in conjunction with the specifics of the explicit workorder to form actual filters. However, in other embodiments any set of rules in the system may have a meta-protocol table that defines, in data, the order in which the rules are to be read, and the filter conditions that are to be applied to those rules, so that that information does not need to be written into the software that reads the rules.

When the system reads the meta-protocol rules and forms appropriate filters based on the explicit workorder data, it first looks for a specific protocol. In the current embodiment, the initial protocol is defined by the circumstances of the work as indicated by the forms used and the selections made on those forms. This protocol ID is utilized by the software process that forms the mask or selection filter. It results in selection of the rules in the Work Protocol Table which have the protocol value in one of their key columns. The protocol ID points the retrieval process to a grouping of related protocol records, thereby enabling work to be carried out in predefined stages.

Each protocol may in turn point to a sub-protocol which causes loading of the next sub-protocol upon completion of the protocol. The benefit of this step-by-step approach over simply loading the entire protocol at once is that, depending on the accomplishment or non-accomplishment of certain tasks, the next stage of the unfolding work transaction may change. Thus, for example, if shipping of a product is never accomplished for some reason, there is no point in loading in the work to perform billing.

The process of generating implicit workorders from the Work Protocol rules is repeated for every stimulus workorder. For each mask formed from the meta-protocol where there is a corresponding match in the Work Protocol rules, there may be a plurality of such records selected, all of which have met the selection criteria.

The record selection process is defined largely in the data structure of the Work Protocol Rules and in particular by that portion that constitutes the record key. Masks formed from the explicit workorder as modified by the Meta-Protocol Table are partial keys which can be used to immediately check whether there are matches on the Work Protocol Table.

Thus the record selection process is not sequential, and does not require reading the entire data structure. It is therefore fast and efficient and avoids the combinatorial explosion that sometimes causes problems with expert systems as the number of rules increases.

The teachings of the invention contemplate that whatever factors exist in any organization or work process to trigger work in the form of implicit workorders shall be added to the key structure as necessary. The above description describes the generic aspects of the implicit workorder generation process portion of the teachings of the invention.

The order in which the Work Protocol rules are retrieved from the Work Protocol Table is essential, since in the event of two rules defining different values for an attribute (e.g. sales tax percentage), the CoRE650 will use the first record selected and ignore the second. An attribute is considered a "duplicate" when there is already an identical attribute (but probably having a different value) on the associated workorder. To ensure that the proper (desired) value is written as an attribute (e.g., of a workorder), the Meta-Protocol Table defines the order that the implicit records are to be retrieved from the Work Protocol Table.

After a stimulus workorder has invoked a protocol, the system sorts the resulting workorders by relative sequence number ("RSN") to sequence their execution correctly. Computer-based services having quantitatively lower RSNs are executed first. Work assigned to people does not use RSNs. Work assigned to any person is sent to their defined work queue and displayed on the work list for that person.

A key objective according to the teachings of the invention is to provide decision support to the agencies assigned to do the work specified in the implicit workorders. This facility is provided through the mechanism of work queues having controls displayed on those decision panels which the user agency can use to access other information needed to do the work ordered.

After the implicit workorders have been distributed to the appropriate work queues, an agency assigned to do the work will do the work, and when it is finished, invoke a "submit" button or generate another signal indicating that the work has been completed. This process is symbolized by step 110. After the workorders are finished they update the Summary Statistics data (currently called the "Product or Service Movement Table") in summary form, for subsequent executive analysis. This process is symbolized by step 120.

What is claimed is:

1. A computer-readable storage medium having stored thereon elements of a system for the creation and/or execution of workorders, comprising:

a plurality of functional software objects;

tables of rule information, such rule information comprising:

existential rules that declare the existence of each and every type of entity and specific entities known to said system, which rules contain only a declaration of each entity's identifier and metadata, said metadata comprising at least one of the following:

a Pin Flag to specify whether the exact contents of an existential entity are referred to literally in the system, and therefore require coordination with a user before being changed;

a Research Flag to indicate whether the rule requires further research on the part of a rule-maker;

internal notes regarding the rules;

an updated by entry for indicating the source of the last update to the rule; and the date and time of the latest update to the rule;

non-existential attribute rules that declare known attributes of entities specified in the existential rules in terms of other existential entities known to the system, or certain general values, or both, said attribute rules comprising:

a first primary key column as a foreign key to an existential rule defining possible entities;

a second primary key column specifying an attribute type as a foreign key to an existential rule defining valid attribute types;

at least one foreign key to at least one existential rule;

columns for values representing at least one of the following: general number, general date and time, general text, or general Boolean;

metaprotocol columns non-existential protocol rules defining certain conditions under which implicit workorders will be generated, as well as the specific actions and contents of each step of each implicit workorder, as well as certain metadata, said protocol rules comprising:

a plurality of primary key columns as foreign keys to various existential rules defining possible entities;

a primary key column specifying an attribute type as a foreign key to an existential rule defining valid attribute types;

at least one foreign key to at least one existential rule;

columns for values representing at least one of the following: general number, general date and time, general text, or general Boolean;

metaprotocol columns;

non-existential meta-protocol rules defining rules for creating masks, and mask sequences, for determining which of said protocol rules to follow and in what order they are followed, as well as certain metadata;

an interface to the system, comprising:

a mechanism permitting modification, directly by an administrator without recourse to further software programming, if not marked by a true value in the pin flag column, of at least one of the following: said existential rules, said attributes rules, said protocol rules, said meta-protocol rules, and a combination of said rules;

a mechanism permitting the specification of an explicit workorder either by users or by the system, or by both;

wherein at least one of said existential rules and said non-existential rules are used by said functional software objects to govern either the creation or execution of an implicit workorder or both the creation and execution of an implicit workorder.

2. The computer-readable storage medium of claim 1, each row further comprising another column in the primary key for a sequence number to permit specification of more than one value for a particular attribute of a particular entity.

3. The computer-readable storage medium of claim 1, further comprising a plurality of additional functional software objects and data comprising:

representations of said non-existential rules, wherein:

said tables of rule information correspond to a conventional rules table having at least one primary key column and at least one non-primary-key column;

each non-primary-key column of said conventional table is represented by a row in said tables of rule information;

each row having columns which collectively constitute the primary key of each of said tables of rule information, said columns comprising:

the primary key corresponding to the primary key column of said conventional table;

an attribute type of said primary key; and each row having at least one non-primary key column for each existential entity in the system to which the current entity has a relationship, the population of said at least one non-primary-key column determined by the attribute type of the primary key; and each row having at least one column for metadata regarding that row;

wherein each said column is a foreign key to one of a plurality of associated pre-defined existential tables, with the exception of columns containing date-time, numeric, Boolean, or free-form text.

4. The computer-readable storage medium of claim 3, each row further comprising another column in the primary key for a sequence number to permit specification of more than one value for a particular attribute of a particular entity.

5. The computer-readable storage medium of claim 1, further comprising a plurality of additional functional software objects and data comprising:

a sequence number column in the tables of rule information containing meta-protocol rules so that the system may create and check masks in a specified order; and a "stop flag" column in the tables of rule information containing meta-protocol rules so that the system may, upon successful creation and application of a given mask, stop creating and checking further masks before it has checked all rules in said tables of rule information containing meta-protocol rules.

6. The computer-readable storage medium of claim 5, wherein said medium is communicatively coupled to a general purpose computer, further comprising a plurality of additional functional software objects and data comprising:

instructions to the computer, in the form of a workorder, that can be assigned to a computer service and thereby executed by the computer in due sequence, or alternatively can be executed immediately by the computer.

7. The computer-readable storage medium of claim 5, further comprising a plurality of additional functional software objects and data comprising:

a product or services attribute table specifying which specific work attribute values to use when determining input values from a stimulus workorder to the mask-generation process, based upon the current protocol of the stimulus workorder.

* * * * *